United States Patent [19]
Leonard

[11] Patent Number: 5,546,480
[45] Date of Patent: Aug. 13, 1996

[54] HYBRID ALL OPTICAL SILICA WAVEGUIDE MODULATOR USING NON-LINEAR ELECTRO-OPTIC COMPONENTS

[75] Inventor: Jerry Leonard, Plano, Tex.

[73] Assignee: Texas Instruments Incorporated, Dallas, Tex.

[21] Appl. No.: 430,998

[22] Filed: Apr. 28, 1995

[51] Int. Cl.⁶ ........................................... G02F 1/01
[52] U.S. Cl. .................. 385/3; 385/5; 385/122; 385/144
[58] Field of Search .................. 385/1–5, 122, 385/129, 130, 132, 141, 142, 144, 145

[56] References Cited

U.S. PATENT DOCUMENTS

| | | | |
|---|---|---|---|
| 4,936,645 | 6/1990 | Yoon et al. | 385/2 |
| 5,315,422 | 5/1994 | Utaka et al. | 385/5 X |

OTHER PUBLICATIONS

*SPIE Integrated Optical Circuits II*, vol. 1794, '92, Chen et al., "Polymer–glass–waveguide all–optical switches", pp. 388–396. (No Month).

*Nuclear Instrumewnts/ Methods in Physics Research B65*, '92, Haglund, Jr. et al., "Nonlinear index of refraction of Cu–and Pb–implanted fused silica", pp. 405–411 (No Month).

*Electronics Letters*, vol. 29 No. 5, Mar. 1993, "Silica–Based Optical Waveguide on Terraced Silicon Substrate as Hybrid Integration Platform", pp. 444–446, Y. Yamada et al.

*IEEE Photonics Technilogy Letters*, vol. 6, No. 7, Jul. 1994, Yamada et al., "An Application of a Silica–on–Terraced–Silicon Platform to Hybrid Mach–Zehnder Interferometric–Circuits . . .", pp. 822–824.

*Optical Engineering*, vol. 28 No. 12, Dec. 1989, Yamada et al., "Optical interconnections using a silica–based waveguide on a substrate", pp. 1281–1287.

*Nuclear Instruments/Methods in Physics Research B59/60*, '91, Yang et al., "Laser–induced fluorescence and nonlinear optical properties of ion–implanted fused silica", pp. 1304–1307. (No Month).

Primary Examiner—John D. Lee
Attorney, Agent, or Firm—Bret J. Peterson; James C. Kesterson; Richard L. Donaldson

[57] ABSTRACT

Generally, the present invention is an optically controlled optical waveguide circuit comprising a substrate 30, an inorganic waveguide core 34 disposed within one or more cladding layers 36 upon the substrate 30 and an active cladding drop-in component 40 comprising a non-linear optical material adjacent to the waveguide core wherein the phase of an optical signal within the waveguide core may be modulated by controlling the index of refraction of the active cladding region. An embodiment of the present invention uses an inorganic optical waveguide 34 with a drop-in component of non-linear silica 40 as an active cladding to provide a phase modulator for a Mach-Zender interferometer which can be used to implement high speed low loss switching of optical signals.

14 Claims, 1 Drawing Sheet

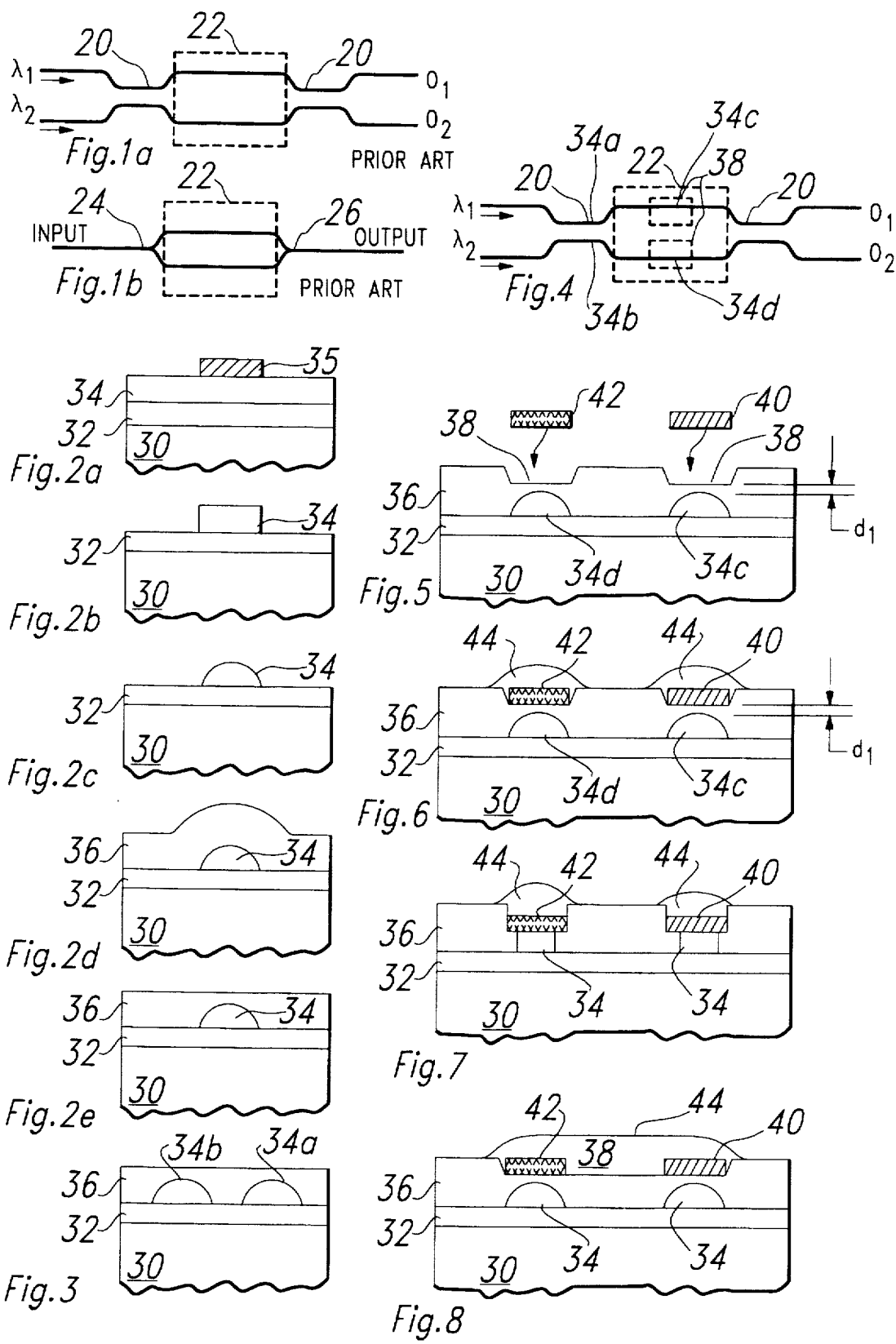

HYBRID ALL OPTICAL SILICA WAVEGUIDE MODULATOR USING NON-LINEAR ELECTRO-OPTIC COMPONENTS

FIELD OF THE INVENTION

This invention relates to switching and modulation of optical signals propagating in an integrated circuit waveguide such as those used in phased array radar systems, high speed data links and other optical communication systems. More specifically the invention relates to using an optically non-linear "drop-in" component as an active cladding in conjunction with interferometers which may be optically addressed to provide modulation of an optical signal in a waveguide.

CROSS-REFERENCE TO RELATED APPLICATIONS

This application is related to Co-pending application Ser. No. 08/431,191 which uses an active cladding fabricated in proximity to an optical waveguide to achieve an optical modulator or switch.

BACKGROUND OF THE INVENTION

Optical signals used in high speed circuits and systems such as telecommunication typically are transmitted over long distance in fiber optic cables. However, on an integrated circuit these signals travel in interconnections called optical waveguides. Optical waveguides in integrated circuits are formed as cores surrounded by one or more cladding layers on a substrate for the purpose of transmitting selected modes of optical radiation. The index of refraction of the core is, for at least one polarization in at least one direction, greater than the index of refraction for materials adjacent to the waveguide core, typically called cladding. This difference in index of refraction keeps the light traveling within the optical waveguide due to total internal reflection.

High speed communication systems require optical components that are high speed with low absorption and scattering loss of the optical signal traveling in the optical waveguide. Optical waveguides in integrated circuits fall into two general categories, those using organic and those using inorganic glass core materials and cladding. Inorganic glass waveguides such as $SiO_2$ have proven to be capable extremely low loss, while organic waveguides offer simplified fabrication and electro-optic capability but typically without the lower loss of inorganics.

Hybrid structures have been gaining interest in the optical arena because of the ability to utilize and combine processes and materials that are not completely compatible into a multi-functional device. Yamada et. al discloses a hybrid Mach-Zender interferometer circuit consisting of silica-waveguide directional couplers and a $LiNbO_3$ drop in phase shifter chip in "An Application of a Silica-on-Terraced-Silicon Platform to Hybrid Mach-Zender Interferometer Circuits Consisting of Silica-Waveguides and $LiNbO_3$ Phase-Shifters," IEEE Photonics Tech. Letters, Vol. 6 No. 7 July 1994. The device uses an integration platform consisting of a optical waveguide in a silicon substrate with a terraced region, an STS platform (Silica-on-Terraced -Silicon-Platform) to form an optical bench for the optoelectronic device composed of $LiNbO_3$.

SUMMARY OF THE INVENTION

The present invention provides a hybrid optical waveguide circuit comprising: a substrate; a non-organic waveguide core deposed within one or more cladding layers upon the substrate and an active cladding region; and an optically addressed hybrid component of non-linear optical material adjacent to the waveguide core. Using this structure, the phase of an optical signal within the waveguide core may be modulated by controlling the index of refraction of the non-linear optical material.

Reports have been made of optical circuits having combined the benefits of organic and non-organic materials. Chen et. al. discloses two polymer on glass waveguide switches in SPIE Vol. 1794, Integrated Optical Circuits II (1992), p. 388–396. The first is a X-branch glass waveguide with a strip of nonlinear polymer core on the center top of the two-mode region. The second is an asymmetric Y-branch glass waveguide with a strip of non-linear polymer on the top of one branch. These circuits confine the light energy primarily to the polymer core, in contrast to the present invention where a drop-in component is used as an active cladding. In addition, both are all optical switches, that is they are activated by changes in the optical power of the signal. All optical switches provide high speed switching but are limited to those designs where signal intensity can be modulated to control the switch. While some optical circuits have used the benefits of drop-in waveguide structures, apparently this is the first use of a non-organic waveguide with an active cladding hybrid component to provide an electro-optic modulator or switch.

An embodiment of the present invention uses an inorganic optical waveguide with an optically addressed hybrid component of active cladding to provide a phase modulator for a Mach-Zender interferometer which can be used to implement high speed, low loss switching of optical signals. The hybrid component is a drop-in component of active cladding. A pit is formed in upper cladding in the interferometer region to allow the active cladding drop-in component to be placed in close proximity to the waveguide core. After the pit is formed, an active cladding drop-in component is placed in the pit in the interferometer region and may be cemented with an adhesive having a closely matching index of refraction. The material of proper index of refraction is chosen to provide a phase shift when a desired optical activation signal is applied to the waveguide core.

An embodiment of the present invention uses an inorganic optical waveguide with an optically addressed hybrid component of active cladding to provide a phase modulator for a Y-Branch interferometer which can be used to implement high speed low loss switching of optical signals.

In each of the two circuit embodiments above, the present invention utilizes as a modulator an interferometric region of the circuit. This region contains two waveguide cores separated to insure there is little or no coupling between the two cores.

Preferably, a drop-in component in one leg of the interferometer is fabricated from a non-linear optic material, which is a material that exhibits a characteristic shift in its index of refraction when exposed to an increased intensity of light energy. Therefore, the switch can be activated by increasing the intensity of the signal propagating in the waveguide core which increases the index of refraction and causes a corresponding shift in the phase of the light signal in that arm of the interferometer. Although only one arm of the interferometer is activated to produce the desired index shift, it may be advantageous to fabricate the identical structure on both arms of the circuit in the interferometer region to preserve the phase relationship of the signals in the two arms in the non-active mode. In this arm of the interferometer the drop-in component is fabricated from a material that is optically neutral or inactive but which has a similar index to the non-linear drop-in component in the off state. Thus one leg of the interferometer experiences a phase shift due to the non-linear leg but the corresponding leg has no such shift, resulting in the desired effect.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 1 Shows a typical prior art circuit structures which can use the phase modulator of the current invention, FIG 1a - Mach-Zender interferometer, and FIG 1b - Y Branch interferometer;

FIGS. 2a–2e Illustrates the process steps to fabricate the waveguide in a preferred embodiment;

FIG. 3 Represents a cross-sectional view of the 3 dB coupling region of FIG. 1a;

FIG. 4 Shows a Mach-Zender Schematic showing elements of a preferred embodiment of the present invention;

FIG. 5 Shows the insertion of Drop-In components in a preferred embodiment of the present invention;

FIG. 6 Shows a preferred embodiment of the present invention after insertion of Drop-In components;

FIG. 7 Illustrates a preferred embodiment with square waveguide cores; and

FIG. 8 Illustrates an alternative embodiment with a single pit.

DETAILED DESCRIPTION OF THE PREFERRED EMBODIMENTS

The preferred embodiments of the present invention is best understood by referring to FIGS. 1–8 of the drawings, like numerals are used for like and corresponding parts of the various drawings.

With reference to FIG. 1, there is shown two possible circuits which can be used with a phase modulator and method of the present invention. FIG. 1a is a Mach-Zender interferometer and FIG. 1b is a Y-Branch interferometer. In the Mach-Zender circuit, incoming signals on the two inputs $\lambda_1$ and $\lambda_2$ are split by the 3 dB coupler 20 into the two waveguides in the interferometric region 22. The phase modulator of the present invention is placed in one or both of the waveguides in this interferometric region. These two waveguide arms are separated to eliminate coupling between them. For an input at $\lambda_1$ which does not have sufficient intensity to induce a phase shift in the light of one leg in the interferometer region, the light arrives at the output of the upper waveguide $O_1$. However, by introducing a π phase shift in the interferometer the light incident in $\lambda_1$ would then exit from the lower output waveguide $O_2$. The result is a 2×2 switch for which both states can be achieved.

In the Y-Branch interferometer, FIG. 1b, the 3-dB (50/50) splitter and combiner is a symmetric Y branch. Light entering in the single-mode waveguide is equally divided into the two waveguides with zero relative phase difference at the first Y-Branch 24 junction. The two arms are then separated to eliminate coupling in the interferometric region 22. If the interferometer is not activated, the two beams arrive at the output Y-Branch in phase and are combined into the output waveguide. Other than slight losses the output is essentially the same as the input. However, if the interferometer region is activated, a π phase difference can be introduced in one arm of the interferometer region. The light is then combined at the output Y-Branch 26 to a mode not supported by the single-mode fiber resulting in radiation of the light out of the waveguide, effectively turning off the output. Thus, the circuit can be operated as an optical modulator or on/off switch.

With reference to FIGS. 2a–2e, there is shown a method of forming the waveguide cores for an embodiment of the present invention. FIG. 2a illustrates a silicon substrate 30 with a layer of $SiO_2$ 32 as a lower cladding. A layer of phosphosilicate glass (PSG) 34 is then applied to the cladding to be formed into the waveguide core. Photoresist 35 is applied and patterned using conventional techniques to mask the area above the core. FIG. 2b shows the waveguide core 34 after etching and removal of the resist 35. The waveguide core 34 is then placed into a 1000° C. furnace with a steam ambient to reflow the PSG to obtain the rounded shape shown in FIG. 2c. The rounded shape reduces optical losses by smoothing the core walls and provides greater upper cladding step coverage in between cores due to reduced aspect ration of the cores.

A layer of undoped $SiO_2$ 36 cladding is then applied (e.g. by CVD) over the surface of the circuit resulting in a profile shown in FIG. 2d. This upper cladding layer 36 is then planarized as shown in FIG. 2e to allow further processing on the circuit as discussed below. The planarization is preferably done by common resist etchback techniques. The cladding is applied in sufficient thickness such that after the planarization step the cladding remaining above the waveguide core is fairly thick, preferably about 3 to 6 um, and most preferably greater than 6 um. The thickness of the cladding is important in maintaining control of the optical energy in the core region. This thick cladding is preferably on all areas over the circuit outside the pit 38 in the interferometer region 22, discussed below.

FIG. 3 illustrates the cross-sectional view of the 3 dB coupling region 20 in the Mach-Zender circuit shown in FIGS. 1a and 4. Waveguide cores 34a and 34b shown in FIG. 3 are preferably fabricated according to the method of FIG. 2a–2e. The two waveguides 34a 34b are fabricated in close proximity to produce the 3 dB coupling of light signals from one waveguide to the other.

While each of the embodiment circuits discussed above, the Mach-Zender and Y-Branch, contained an interferometer region 22 as illustrated in FIGS. 1a and 1b, for clarity the remainder of the description will focus on the Mach Zender circuit of FIG. 4, but the discussion is applicable to the Y-Branch circuit as well. In FIG. 4, two waveguide cores 34c and 34d are shown parallel some distance apart subsequent to the 3 dB coupling region discussed above. The distance between waveguide cores 34c and 34d is chosen to insure there is no coupling between the two cores, preferably greater than 15 um. The two waveguide cores 34c and 34d pass through two pit regions 38 in the interferometer region 22.

FIG. 5 represents the cross section of the interferometer region 22 of FIG. 4. A pit 38 is a recessed area formed in upper cladding 36 in the interferometer region 22 to allow an active cladding drop-in component to be placed in close proximity to the waveguide core 34 while maintaining a thick cladding region in the non-interferometric regions. The pit 38 is preferably formed by dry etching to obtain a recess in the thick upper cladding in the interferometer region 22. This recess is preferably deep enough to allow external interaction with the optical energy in the waveguide core. Distance d1 is the distance between the core and the pit surface where the drop-in component will be placed. Generally the goal is to minimize d1 to increase the effect of the active cladding while allowing for process variance such that the core is not disturbed during fabrication of the pit. Distance d1 is preferable less than 1000 A°.

FIGS. 4 and 5 illustrate an interferometer region containing two pits, one in each leg of the interferometer. After the pits are formed, drop-in components 40 and 42 are placed in the pits 38 in the interferometer region 22 and preferably cemented with an adhesive 44 having a closely matched index of refraction as illustrated in FIG. 6. The active cladding drop-in component 40 is fabricated from a non-linear optic material, which is a material that exhibits a characteristic shift in its index of refraction when exposed to an increased intensity of light energy. Therefore, the switch can be activated by increasing the intensity of the signal propagating in the waveguide core which increases or decreases the index of refraction and gives a corresponding shift in the phase of the light signal in that arm of the interferometer. The material of proper index of refraction is chosen to provide a phase shift when a desired optical activation signal is applied to the waveguide core. A material for the drop-in component for a preferred embodiment is ion implanted fused silica, which has a non-linear index of refraction and is fabricated with copper or lead doping. See Haglund et al. Nonlinear index of refraction of Cu- and Pb-implanted fused silica, Nucl. Instr. and Meth. B65 (1992) 405–411. This illustrates an advantage of the present invention where a material can be optimized for use as an active cladding regardless of process compatibility with the substrate or waveguide materials. A variety of material and doping levels can be used to fabricate the drop-in component which is then cemented into place to form an active cladding modulator.

Although only one arm of the interferometer is typically activated to produce the desired index shift, it may be advantageous to fabricate the identical structure on both arms of the circuit in the interferometer region to preserve the phase relationship of the signals in the two arms in the non-active mode. Typically, only one arm of the interferometer is activated to produce the desired index shift. However, it is often desirable to fabricate the identical structure on both arms of the circuit in the interferometer region to preserve the phase relationship of the signals in the two arms in the non-active mode. Specifically, a preferred method to preserve the non-active index of refraction as closely as possible, is to place a drop-in component 42 non active material in the non-active leg.

Other embodiments are illustrated in FIGS. 7 and 8. FIG. 7 illustrates the cross section of a preferred embodiment where the step to round the waveguide core is skipped in the above process. The drop-in component may then be placed directly on the waveguide core as shown on the left with overlapping edges, or as shown on the right with no overlap. Alternatively, the drop-in components can be cemented into place where some of the adhesive is between the drop-in component and the waveguide core (not illustrated) with an adhesive that has an index of refraction closely matched to the drop-in component. FIG. 8 illustrates an embodiment where the pit 38 is large enough to extend over both legs of the waveguide in the interferometer region. The two drop-in components 40, 42 and the adhesive 44 are then placed in the common pit, preferably in a single operation.

The sole Table, below, provides an overview of some embodiments and the drawings.

TABLE

| Element | Specific Name | Generic Name | Alternatives |
|---|---|---|---|
| 20 | 3dB Coupler | | |
| 22 | Interferometer Region | Interferometer | |
| 24 | Input Y-Branch | | |
| 26 | Output Y-Branch | | |
| 30 | Silicon | Substrate | GaAs |
| 32 | $SiO_2$ | Cladding | Doped $SiO_2$ |
| 34 | PSG Core | Waveguide Core | Doped Si |
| 35 | Photoresist | Photoresist | |
| 36 | $SiO_2$ | Cladding | Silicon Oxides, Silicon Nitrides |
| 38 | Pit | | |
| 40 | Drop-In Component of Non-Linear Silica | Drop-In Component | Non-linear Opt Polymer |
| 42 | Drop-In Component of Non-active Silica | Drop-In Component | |
| 44 | Matched index adhesive | Adhesive | |

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

Some examples of contemplated modifications and alternate embodiments include variations in fabrication steps. For instance, while the discussion of the preferred embodiments limited the planarization step to common etchback techniques, the present invention also contemplates using techniques such as mechanical polishing, or chemical-mechanical polishing. In addition, the pit may be formed by any standard process to obtain a recess in the thick upper cladding in the interferometer region as shown in FIG. 1. While the discussion focused on the Mach-Zender circuit, the same principles apply to the Y-Branch circuit. For example either the single or double pit could be used with either circuit.

What is claimed is:

1. A non-linear optic waveguide circuit comprising:
   (a) a substrate;
   (b) at least one inorganic core waveguide core disposed within at least one cladding layer upon said substrate; and
   (c) an active cladding drop-in component comprising a non-linear material placed adjacent to said core waveguide core, wherein the phase of an optical signal within said waveguide core may be modulated by controlling the index of refraction of said active cladding drop-in component by changing the intensity of the optical signal propagating in the optical core.

2. The circuit of claim 1, wherein the core material is glass.

3. The circuit of claim 1, wherein the optically non-linear material is ion implanted fused silica with said ions being from the group of copper or lead.

4. The circuit of claim 1, further comprising:

(d) two inorganic waveguide cores with inputs within said cladding layer and upon said substrate;

(e) a first 3 dB coupler to provide 3 dB splitting between said waveguide cores subsequent to said inputs;

(f) a non-coupling interferometric region subsequent to said coupler; and (g) a second 3 dB coupler between said two waveguide cores subsequent to said non-coupling region with outputs, wherein said active cladding region is adjacent to said waveguide cores in said non-coupling region such that the phase of at least one waveguide core optical signal can be modulated.

5. The circuit of claim 4 wherein the core material is glass.

6. The circuit of claim 4, wherein the optically non-linear material is ion implanted fused silica with said ions being from the group of copper or lead.

7. The circuit of claim 1, further comprising:

(d) an input on said inorganic waveguide core;

(e) a first Y-branch to provide 3 dB splitting of an optic signal on said waveguide cores subsequent to said input to two optic waveguide branches;

(f) a second Y-branch to combine said two waveguide branches; and (g) a non-coupling region between said Y-branches;

wherein said active cladding region is adjacent to said waveguide cores in said non-coupling region such that the phase of at least one waveguide core optical signal can be phase modulated.

8. The circuit of claim 7, wherein the optically non-linear material is ion implanted fused silica with said ions being from the group of copper or lead.

9. The circuit of claim 7, wherein the core material is glass.

10. A method of fabricating an optical waveguide circuit comprising:

(a) forming a substrate;

(b) forming at least one inorganic waveguide core disposed within at least one cladding layer upon said substrate; and (c) placing an active cladding drop-in component comprising non-linear optic material adjacent to said waveguide core, wherein the phase of an optical signal within said waveguide core may be modulated by controlling the index of refraction of said active cladding drop-in component by changing the intensity of the optical signal propagating in the optical core.

11. The method of claim 10, wherein the optically non-linear material is ion implanted fused silica with said ions being from the group of copper or lead.

12. The method of claim 10, wherein the core material is glass.

13. The method of claim 10, further comprising:

(d) forming two inorganic waveguide cores having inputs within said cladding layer and upon said substrate;

(e) forming a first 3 dB coupler to provide 3 dB splitting between said waveguide cores subsequent to said inputs;

(f) forming a non-coupling region subsequent to said coupler;

(g) forming a second 3 dB coupler between said two waveguide cores subsequent to said non-coupling region with outputs; and wherein said active cladding drop-in component is adjacent to said at least one waveguide core in said non-coupling region such that the phase of at least one waveguide core optical signal can be modulated.

14. The method of claim 10, further comprising:

(d) forming an optical waveguide with an input;

(e) forming a first Y-branch to provide 3 dB splitting of an optic signal on said optic waveguides subsequent to said input to two waveguide core branches;

(f) forming a second Y-branch to combine said two waveguide branches; and (g) forming a non-coupling region between said Y-branches;

wherein said active cladding drop-in component is adjacent to said waveguide cores in said non-coupling region such that the phase of at least one waveguide core optical signal can be phase modulated.

* * * * *